April 21, 1959  S. PUCCINELLI ET AL  2,883,070
FRUIT TRANSFER DEVICE
Filed Aug. 31, 1953  8 Sheets-Sheet 1

FIG_1

INVENTORS
SYLVIO PUCCINELLI
SHERMAN H. CREED
MARSHALL E. C. FREEMAN
BY *Hans G. Hoffmeister*
ATTORNEY April 21, 1959     S. PUCCINELLI ET AL     2,883,070
FRUIT TRANSFER DEVICE Filed Aug. 31, 1953     8 Sheets-Sheet 2

INVENTORS
SYLVIO PUCCINELLI
SHERMAN H. CREED
MARSHALL E. C. FREEMAN

BY *Hans G. Hoffmeister*
ATTORNEY

April 21, 1959     S. PUCCINELLI ET AL     2,883,070
FRUIT TRANSFER DEVICE Filed Aug. 31, 1953          8 Sheets-Sheet 3

INVENTORS
SYLVIO PUCCINELLI
SHERMAN H. CREED
MARSHALL E. C. FREEMAN

BY *Hans G. Hoffmeister*
ATTORNEY

April 21, 1959 S. PUCCINELLI ET AL 2,883,070
FRUIT TRANSFER DEVICE
Filed Aug. 31, 1953 8 Sheets-Sheet 5

INVENTORS
SYLVIO PUCCINELLI
SHERMAN H. CREED
MARSHALL E. C. FREEMAN
BY Hans G. Hoffmeister
ATTORNEY

FIG_14

FIG_15

FIG_16

FIG_17

United States Patent Office 2,883,070
Patented Apr. 21, 1959

2,883,070

FRUIT TRANSFER DEVICE

Sylvio Puccinelli, San Jose, Sherman H. Creed, Campbell, and Marshall E. C. Freeman, San Jose, Calif., assignors to Food Machinery and Chemical Corporation, San Jose, Calif., a corporation of Delaware Application August 31, 1953, Serial No. 377,616

13 Claims. (Cl. 214—1)

This invention relates to fruit preparation apparatus and more particularly to mechanism for transferring fruit from one part of a fruit treating machine to another.

An object of the invention is to provide an improved fruit transfer mechanism.

Another object is to provide an improved fruit clamp assembly for fruit handling apparatus.

Another object is to provide locking means for a fruit clamp to assume holding a piece of fruit immobilized in the clamp during transfer of the fruit and treatment thereof in the performance of one or more steps of preparing the fruit for canning or drying.

Another object of the invention is to provide a fruit transfer device which is fully automatic in the performance of its several operations.

The invention possesses other objects and valuable features which will become apparent from the following description and the drawings, in which:

Figure 3 is a top plan of the transfer mechanism of Figs. 1 and 2.

Figure 1:
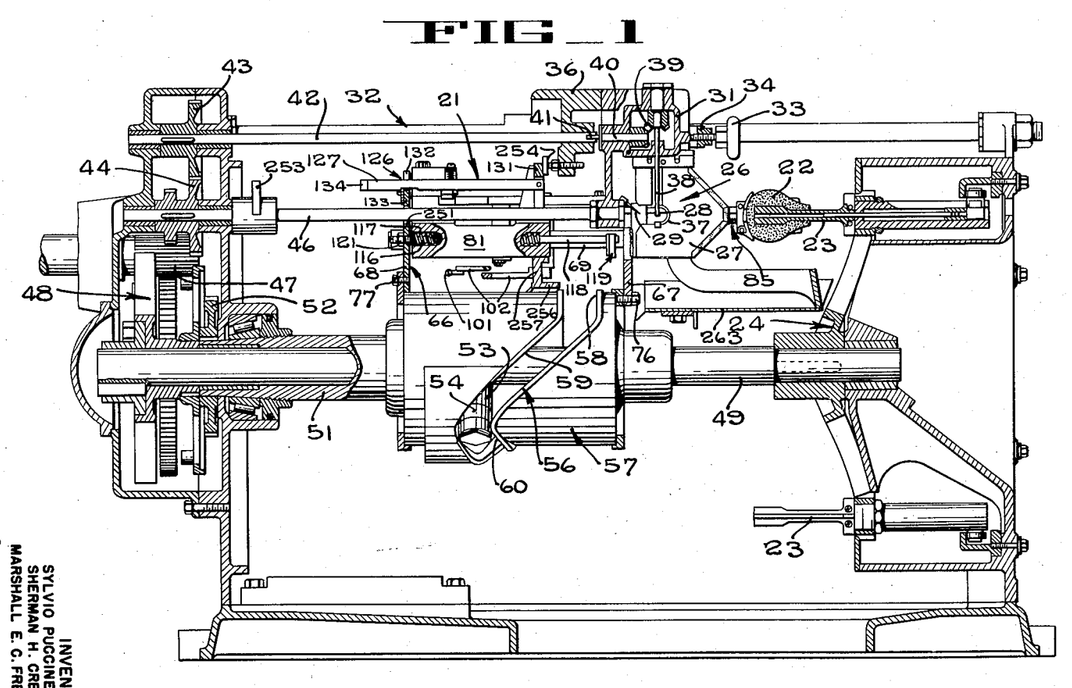
Figure 1 is a vertical section of a fruit preparation machine including a transfer mechanism incorporating the principles of the invention.

The fruit transfer mechanism of the present invention constitutes an improvement over the device for transporting fruit such as pears, in the fruit preparation machine disclosed in Patent No. 2,139,704, issued December 13, 1938, to Thompson and De Back, to which reference may be had for a complete understanding of all of the steps of stemming, coring, peeling, trimming, and splitting of pears in the process of preparing the fruit for canning or drying. Fig. 1 illustrates the improved transfer mechanism, indicated at 21, operatively installed in such a fruit preparation machine, to receive pears 22 individually from stemming tubes 23 carried by an intermittently rotated turret 24 whereby a continuous procession of the pears 22 are presented successively to a series of peeling devices (not shown), each of which operates to peel a portion of a pear each time the turret 24 comes to rest. After having been presented to the several peelers in turn, each peeled pear is advanced by the turret 24 to, and immobilized in, a position of alignment with a splitting, coring and trimming station 26.

It is the function of the transfer mechanism 21 to engage the peeled pears 22 and to transport them, one at a time, from the stemming tubes 23 upon which they have been impaled during the peeling operations, to the splitting, coring and calyx trimming knives 27, 28 and 29, respectively, as will be more fully explained hereinbelow. Both the splitting knife 27 and the coring knife 28 are carried by a housing 31 secured to the frame 32 of the fruit preparation machine by a screw 33 threaded through a yoke 34 pivoted to a bridge member 36 against which the housing 31 is clamped by tightening the screw 33. The splitting knife 27 is rigidly mounted depending from the under side of the housing 31 in the vertical plane into which the axis of a stemming tube 23 comes to rest after being carried by the turret 24 from the last of the peeling devices to operate on the pears.

The coring knife 28 is of arcuate form, and is mounted in an opening 37 in the splitting knife 27, on the lower end of a shank 38 connected through intermeshing bevel gears 39 to a stub shaft 40. A key 41 detachably connects the stub shaft 40 to a countershaft 42 driven by a gear 43 enmeshed by a gear 44 on another countershaft 46 on which the calyx trimming knife 29 is mounted. The ratio of the gears 43 and 44 is 1 to 1, so that both countershafts 42 and 46 rotate simultaneously and coextensively. They are driven by a gear 47 turned intermittently by a Geneva drive 48 and in suitably timed relation to the turret 24, the shaft 49 of which is also intermittently turned by the Geneva drive 48. The ratio of the gears 44 and 47 is such that each time the turret 24 is rotated through an angular distance corresponding to the angular spacing of the several stemming tubes 23, the countershafts 42 and 46 are each rotated through one full revolution.

A sleeve 51 journalled on the shaft 49 is rotated by a gear 52 which is connected to the main drive of the machine by mechanism (not shown) which causes the sleeve 51 to rotate continuously at the rate of one full turn for each periodic actuation of the turret 24. A post 53 rigid with and extending radially from the sleeve 51 carries a roller 54 engaging within a cam slot 56 in a cam cylinder 57 which is journalled on the shaft 49 and the sleeve 51 for axial reciprocation thereon. The cam cylinder 57 is restrained from rotation about the axis of the sleeve and shaft and is guided in its axial reciprocatory movements by suitable means (not shown). The cam slot 56 includes a portion 58 extending part-way around the cam cylinder 57 in a plane to which the common axis of the shaft 49 and sleeve 51 is perpendicular, and two reversely related angular, or sloping portions 59 and 60 respectively. The portions 58, 59 and 60 are all interconnected so that the cam slot 56 is continuous throughout the entire circumference of the cam cylinder 57. The disposition of the sloping parts 59 and 60 of the cam slot 56 is such that the rotating post 53 and roller 54 advance and retract the cam cylinder 57 once during each period intervening between each two successive rotative movements of the turret 24.

Figure 2:
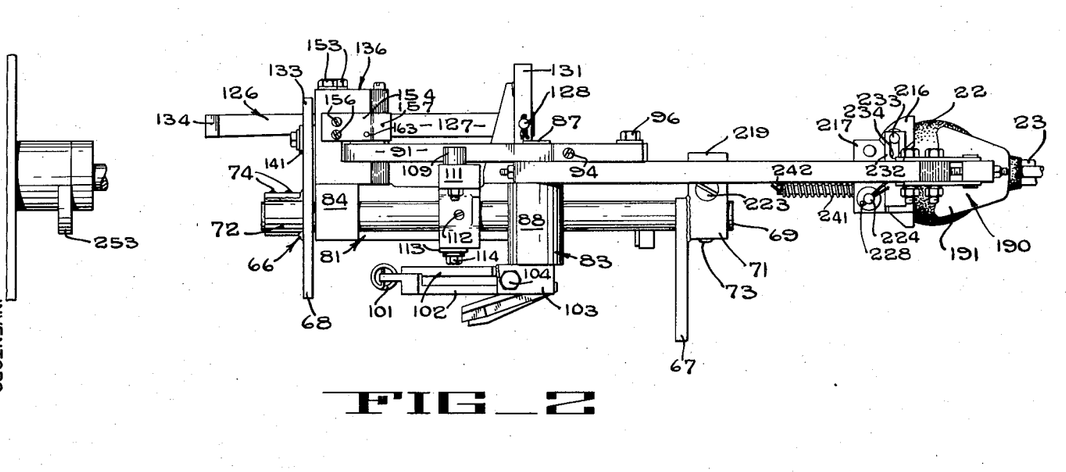
Figure 2 is a side elevation of the transfer mechanism of Fig. 1.
Figure 6:
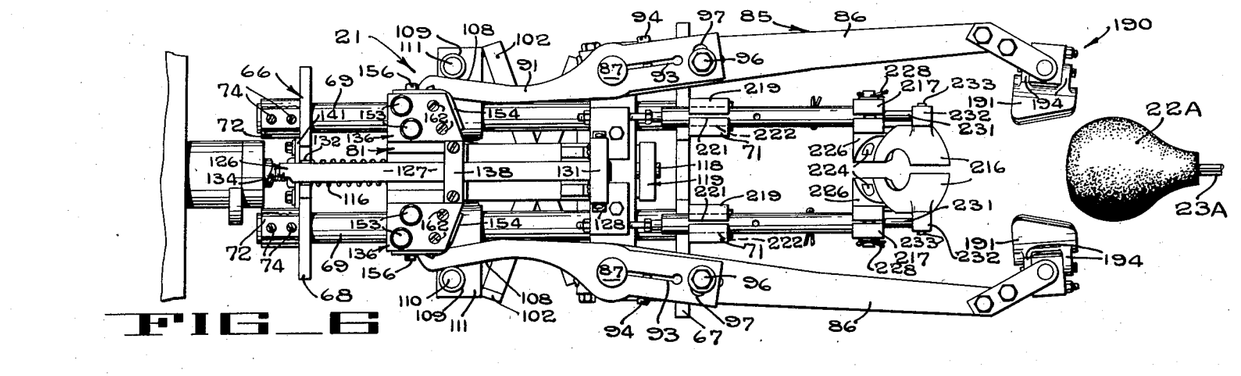
Figure 6 is a view similar to Fig. 3 with the parts positioned as in Fig. 5.

The fruit transfer device of the present invention comprises a frame 66 including front and rear end plates 67 and 68, respectively, rigidly interconnected by spaced, parallel rods 69 fitted to sockets 71 and 72 with which the plates 67 and 68, respectively, are provided, and to which the rods 69 are fastened by set screws 73 (Fig. 4) and 74 (Figs. 2, 3 and 6). The frame 66 is mounted upon the cam cylinder 57 for reciprocatory movement therewith toward and away from the turret 24, by bolts 76 and 77 (Fig. 1) extending respectively through the front plate 67 into the front end of the cam cylinder 57 and through the rear plate 68 into the after end of the cam cylinder 57.

A carriage 81 is journalled on the rods 69 for reciprocatory movement with respect to the frame 66. The carriage 81 comprises a body portion 82 (Fig. 7) and forward and after heads 83 and 84, respectively, having aligned holes (not shown) through which the rods 69 extend with a sliding fit to mount the carriage 81 on the frame 66.

Figure 8:
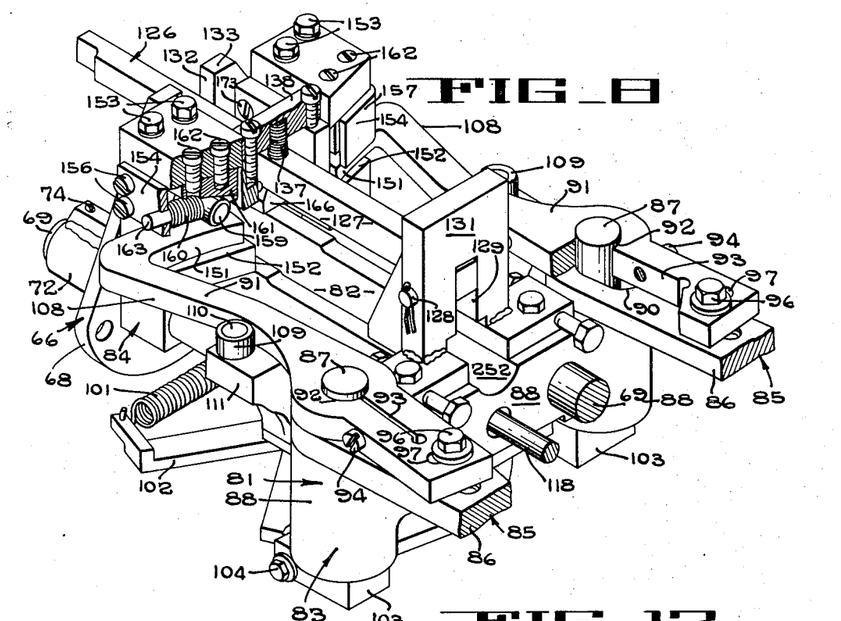
Figure 8 is an enlarged fragmentary perspective of part of the transfer mechanism of the invention.

The carriage 81 provides reciprocable support for a fruit clamp 85, comprising two clamp arms 86, each of which is adjustably secured to the upper end of a rock shaft 87 journalled in an extension 88 of the forward head 83 of the carriage. Each clamp arm 86 is provided with a hole 90 (Fig. 8) adjacent its after end to which the associated rock shaft 87 is fitted with a slip fit. A rearward extension 91 of each clamp arm 86 is provided with a hole 92, the effective size of which is made variable by a slot 93 extending radially from the hole 92. A clamp screw 94 extending across the slot 93 can be tightened to draw the sides of the extension 91 toward each other, thereby narrowing the slot 93 and effectually reducing the size of the hole 92 to tighten the extension 91 in selected position of rotational adjustment upon the upper end of the associated rock shaft 87. Each extension 91 extends forward from its rock shaft 87 in superimposed relation to the associated clamp arm 86 to which it is adjustably secured by a cap screw 96 extending loosely through a slot 97 in the extension 91 and threaded into the associated clamp arm 86. The slots 97 are arcuate about the axes of their respectively associated rock shafts 87, permitting adjustment of the clamp arms 86 with respect to the extensions 91 to attain the desired extent of separation of the clamp arms 86. The hole 90 in each clamp arm 86 is elongated (Fig. 8) in the direction of the major axis of the arm, and the capscrew 96 is optionally receivable in either of two spaced tapped holes 98 (Fig. 4) in the arm, thus permitting variation in the effective length of the clamp arm 86 to accommodate pears of different average sizes.

Means are provided for simultaneously swinging the two clamp arms 86 in opposite directions about the axes of their respective rock shafts 87 to and from fruit clamping arrangement. A coil spring 101 is under tension between the distal ends of two arms 102 which cross each other and are spaced apart one above the other to permit freedom of movement with respect to each other. Each of the arms 102 is rigid with a block 103 adjustably clamped to the lower end of one of the rock shafts 87 by means of a clamping screw 104 extending across a slot 106 (Fig. 4) in the block, intersecting and extending radially from the hole 107 in which the lower end of the associated rock shaft 87 is fitted. Inasmuch as the two arms 102 carrying the tension spring 101 cross each other, the force exerted by the spring 101 urges the clamp arms 86 toward each other.

Figure 5:
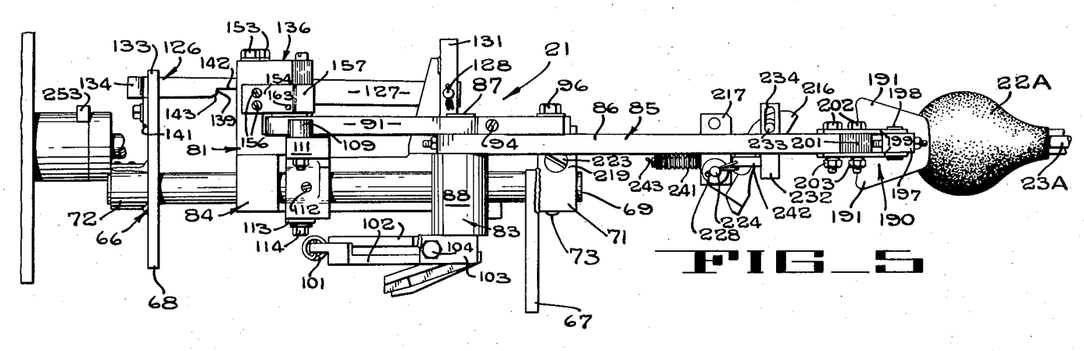
Figure 5 is a view similar to Fig. 2, illustrating the parts in a position farther advanced than in Fig. 4.

Each of the clamp arm extensions 91 is provided with an inclined surface 108 on its outer edge (Figs. 3, 6 and 8) so arranged that the two inclined surfaces 108 diverge in a rearward direction; i.e., away from the rock shafts 87. Each of the inclined surfaces 108 is engaged by a roller 109 journalled upon a pin 110 rigid with and extending upward from a bracket 111 mounted upon one of the guide rods 69 to which it is rigidly, but adjustably, anchored by a set screw 112 (Figs. 2 and 5). A plate 113 is clamped against bottom faces of the two brackets 111 by cap screws 114, thereby cooperating with the two brackets 111 to define a yoke on which the two pins 110 are mounted. This yoke retains the two pins 110 parallel to each other and at fixed distance apart by maintaining the two bottom faces of the brackets 111 in planar alignment and thereby securely retaining the two brackets 111 against rotation upon their respectively associated guide rods 69.

It will be apparent, therefore, that since the rollers 109 are journalled upon structure which is carried by the frame 66 and are in rolling engagement with the inclined surfaces 108 of the clamp arm extensions 91 which are mounted on the carriage 81, relative motion between the carriage 81 and the frame 66 will effect swinging the extensions 91 and the clamp arms 86 about the axes of the rock shafts 87. If the relative motion between the carriage 81 and frame 66 is such that the rollers 109 move rearwardly, i.e., away from the rock shafts 87, the extensions 91 are drawn together and the clamp arms 86 are separated; and when the rollers 109 move toward the rock shafts 87, they move along the inclined surfaces 108 in the direction of convergence thereof, with the result that the spring 101 is then permitted to draw the arms 102 toward each other, rotating the rock shafts 87 in such a direction that the clamp arms 86 are swung toward each other.

It is important to observe that motion of the clamp arms toward each other is induced only by the spring 101 rather than by any positive mechanical force. Accordingly the spring 101 should be so designed that it urges the clamp arms together only with sufficient force to insure adequate gripping of the fruit with minimum danger of crushing the fruit.

A coil spring 116 (Figs. 4, 6 and 7) under compression between the carriage 81 and the rear plate 68 of the frame 66 continuously urges the carriage 81 to move forwardly on the frame 66, i.e., in that direction which causes the clamp arms 86 to separate. An elongated recess 117 (Fig. 7) is provided in the carriage 81 for the spring 116, extending forward from the after end of the carriage to a point a short distance from the front end of the carriage, thus permitting full retraction of the carriage 81 to a position closely adjacent the rear plate 68 of the frame 66. A rod 118 extends axially through the spring 116 and through the front end of the carriage 81, so that a head 119 on the forward end of the rod 118 provides an abutment limiting forward motion of the carriage 81 on the frame 66. A pad 120 of cushioning material is provided on the after face of the head 119 in position to engage the front end of the carriage 81 when the carriage reaches the forward limit of its motion with respect to the frame 66 and thus cushion any shock coincident with arresting motion of the carriage 81. The after end of the rod 118 is threaded through the rear plate 68 of the frame 66, so that the effective length of the rod 118 is adjustable, and a lock nut 121 (Figs. 4 and 7) threaded on the rod 118 engages the after face of the rear plate 68 of the frame 66 to lock the rod 118 in selected position of adjustment.

Figure 4:
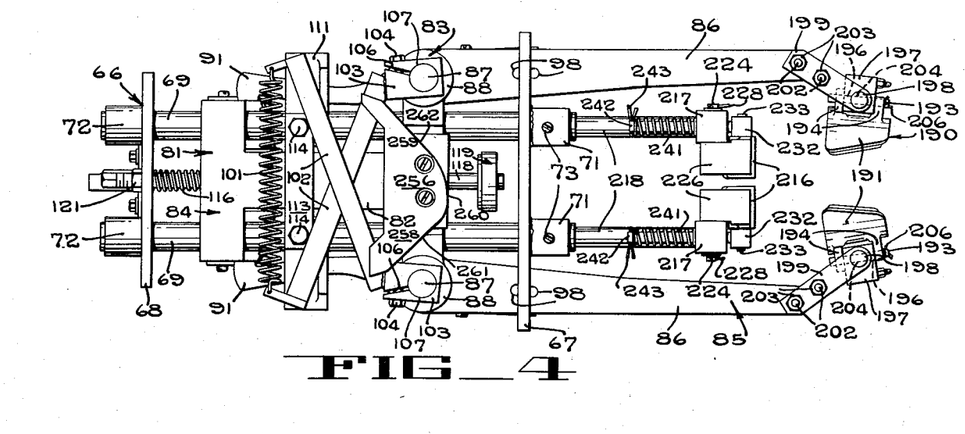
Figure 4 is a bottom plan of the transfer mechanism of the invention, illustrating its parts in a position different from that of Fig. 1.
Figure 12:
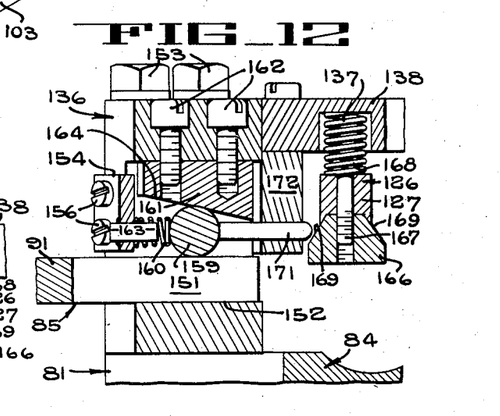
Figure 12 is an enlarged section taken along the line 12—12 of Fig. 3, illustrating a locking device that forms part of the mechanism of the invention.
Figure 13:
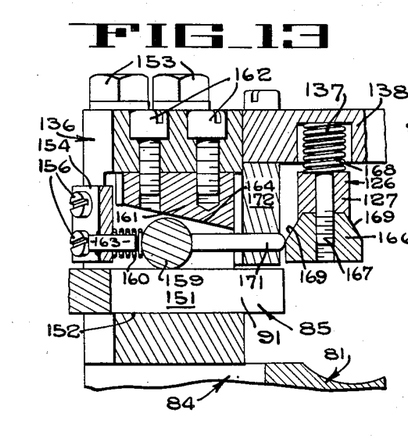
Figure 13 is a view similar to Fig. 12 illustrating a different operational position.

A latch construction 126 is provided for the releasable retention of the carriage 81 in its fully retracted position on the frame 66 wherein the spring 101 is permitted to move the clamp arms 86 into their position of closest approach to each other. The latch construction 126 comprises a latch bar 127 pivotally mounted by a pin 128 extending across an opening 129 (Figs. 7 and 8) in an abutment plate 131 rigid with and extending upward from forward head 83 of the carriage 81. The latch bar 127 extends rearward from the plate 131 through a notch 132 (Figs. 7 and 8) in an upward extension 133 of the rear plate 68 of the frame 66, and is of sufficient length to ride in the notch 132 even when the carriage 81 is in its extreme forward position upon the frame 66 as illustrated in Figs. 4, 5 and 6. Consequently, when the carriage 81 is in its fully retracted position, as illustrated in Figs. 2, 3, 7 and 8, the after end 134 of the bar 127 protrudes a considerable distance beyond the rear plate 68 of the frame 66. At a location between the abutment plate 131 and the rear plate 68 of the frame 66 the latch bar 127 also extends between two upstanding columns 136 on the after head 84 of the carriage 81, and a coil spring 137 (Figs. 8, 12 and 13) under compression between the top of the latch bar 127 and a bridge 138 between the upper ends of the columns 136 presses the latch bar 127 downward so that when the carriage 81 is retracted, a shoulder 139 (Figs. 5 and 7) on the under surface of the latch bar 127 moves into latching engagement with the upper edge of a plate 141 rigid with the rear plate 68 of the frame 66 in position to define the bottom of the notch 132. The shoulder 139 of the latch bar 127 defines the after end of a notch 142 in the under surface of the latch bar 127. The shoulder 139 does not, however, correspond in height to the depth of the notch 142, and a sloping surface 143 extends from the lower edge of the shoulder 139 to the under surface of the latch bar 127 for a purpose to be described hereinbelow.

Means are provided for automatically chocking, or locking each of the clamp arms 86 against spreading apart from any position to which they may be contracted by the spring 101. The chocking means for each arm comprises a finger 151 (Figs. 8, 12 and 13) extending inward from the after end of the associated clamp arm extension 91 substantially perpendicular to a radius drawn through the finger 151 from the axis of the associated rock shaft 87. Each of the fingers 151 extends through an opening 152 in the forward face of one of the columns 136. Each column 136 is in the form of a metal block attached to the upper surface of the after head 84 by cap screws 153. Each column 136 is provided with a retaining band 154 attached to the outer face of the column 136 by screws 156 and extending forward therefrom with its forward end 157 deflected inward substantially in conformity with the front face of the column 136 to confine a roller 159 within the opening 152. Each roller 159 is wedged by a spring 160 between the upper surface of the finger 151 of the associated clamp arm 86 and a backing surface provided by a tapered block 161 anchored against the face of the column 136 defining the upper end of the opening 152 by screws 162. The spring is guided upon a pin 163 rigid with and extending inward from the retaining band 154. Each tapered block 161 is so disposed that its lower surface 164 inclines downward and inward in the direction in which the finger 151 moves when the associated clamp arm 86 moves outward. Since the roller 159 is wedged or chocked firmly between the finger 151 and the inclined lower surface 164 of the block 161, the roller 159 securely locks the finger 151 against inward motion because any such inward motion would necessarily be accompanied by inward motion of the roller 159 also, which is prevented by the downwardly inclined surface 164 of the block 161. However, the roller 159 does not offer any obstacle to outward motion of the finger 151 because the spring 160 yields to outward motion of the roller 159 which accompanies outward motion of the finger 151.

Thus it may be seen that as the two clamp arms 86 move toward each other into clamping engagement upon a pear, the rollers 159 and springs 160 yield, permitting such inward, clamping movement of the arms 86 without interference; but when the clamping arms 86 attain the position in which the pear is firmly clamped, security of such clamping engagement is maintained by the cooperating rollers 159 and tapered blocks 161.

Means operative in suitably timed relation to the reciprocatory movements of the frame 66 and carriage 81 are provided for simultaneously displacing the two rollers 159 from their chocking engagement with the fingers 151 and thereby permitting the clamp arms 86 to separate. For this purpose an upwardly tapered wedge block 166 is rigidly secured to the under surface of the latch bar 127 by a screw 167 (Figs. 12 and 13), the head 168 of which anchors the lower end of the spring 137 in operative position upon the upper surface of the latch bar 127. Each of the two upwardly convergent lateral faces 169 of the wedge block 166 is adapted to engage a pin 171 as the latch bar 127 and wedge block 166 move upwards. Each of the pins 171 extends slidably through a plate 172 secured to the inner face of the associated column 136 by screws 173 (Fig. 8) and is disposed in such position that its inner end is adapted to engage the associated chocking roller 159 in opposition to the spring 160. Each of the pins 171 is of such length that engagement between the pin and the chocking roller 159 does not occur until after the latch bar 127 has moved upward far enough to displace the vertical portion of the shoulder 139 from its engagement with the upper edge of the latch plate 141 for a purpose which will be explained hereinafter. Further upward motion of the latch bar 127 causes the wedge block 166 to push the two pins 171 outward into engagement with the rollers 159 and thereby displace the rollers 159 from chocking engagement with the fingers 151, freeing the clamp arms 86 for unrestricted separating movement.

Figure 14:
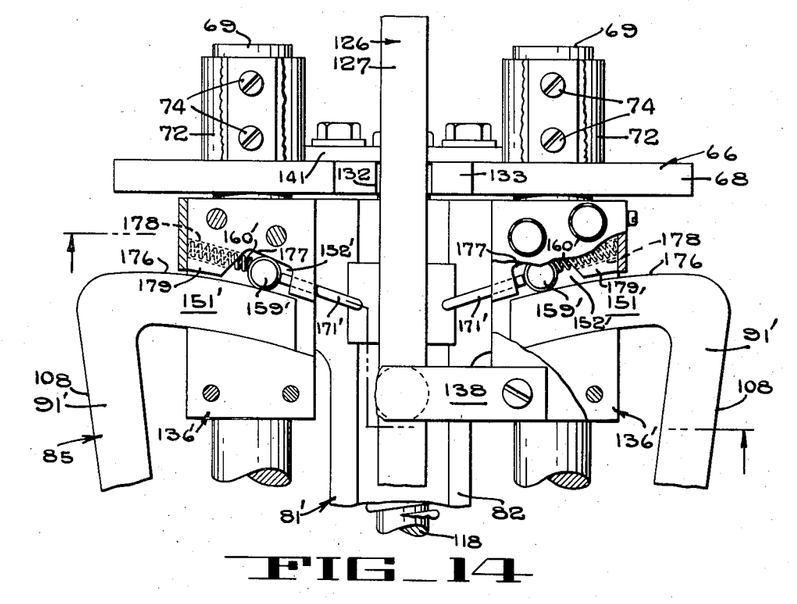
Figure 14 is a plan, partly broken away, showing a modified form of the locking device of Figs. 12 and 13.
Figure 15:
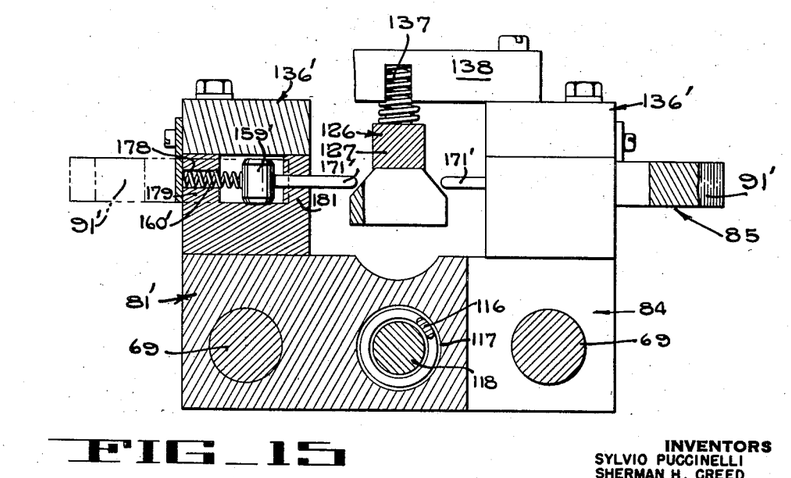
Figure 15 is a sectional view taken on the line 15—15 of Fig. 14.

Figs. 14 and 15 illustrate a modified form of clamp arm locking and releasing mechanism wherein the inwardly extending finger 151' of each of the clamp arm extensions 91' is engaged by a roller 159' which makes chocking engagement with a vertical edge 176 of the finger 151' rather than with an upper surface as in the case of the previously described form of the invention. The roller 159' is wedged between the edge 176 of the finger 151' and a vertical surface 177 defining the back of a recess 152' in the forward face of the associated column 136'. The vertical surface 177 slopes laterally inward toward the vertical edge 176 of the finger 151'; and the edge 176 is of arcuate form centered about the axis of the associated rock shaft (not shown) whereby the clamp arm extension 91' is pivotally mounted upon the carriage 81'. Each roller 159' is urged by a spring 160' into chocking engagement between the associated surfaces 176 and 177, the spring 160' being seated within a socket 178 in a shoulder 179 extending forward from the outer end of the wedging surface 177. The roller 159' is provided with a release pin 171' slidably mounted in another shoulder 181 extending forward from the inner end of the wedging surface 177. The inner end of each pin 171' is in position to be engaged by the wedge block 166 carried by the latch bar 127 when the latch bar 127 is raised. It will be apparent from the hereinabove description of their construction that the operation of this modification of chocking and releasing mechanism is analogous to that of the chocking and releasing mechanism of Figs. 8, 12 and 13.

Figure 16:
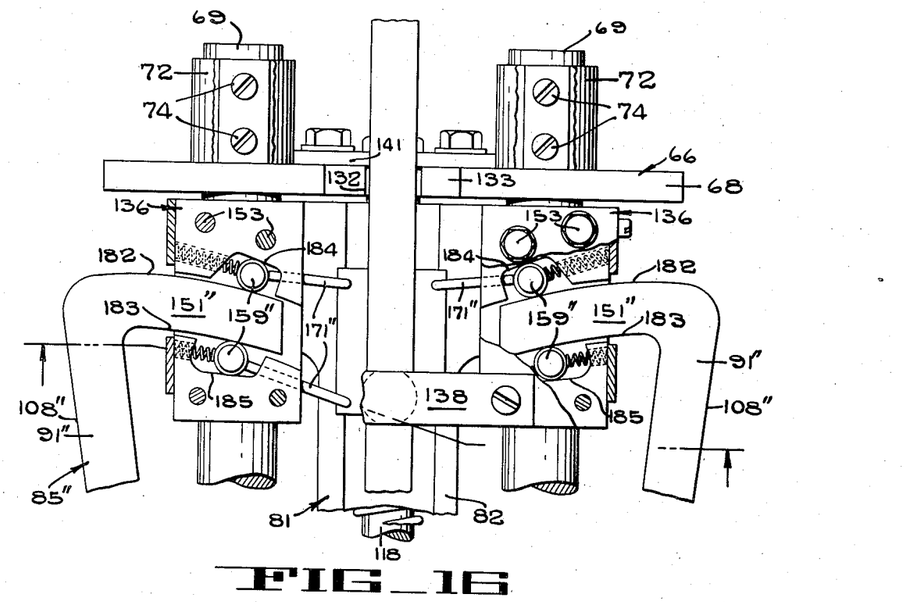
Figure 16 is a view similar to Fig. 14, showing another modified form of the locking device.
Figure 17:
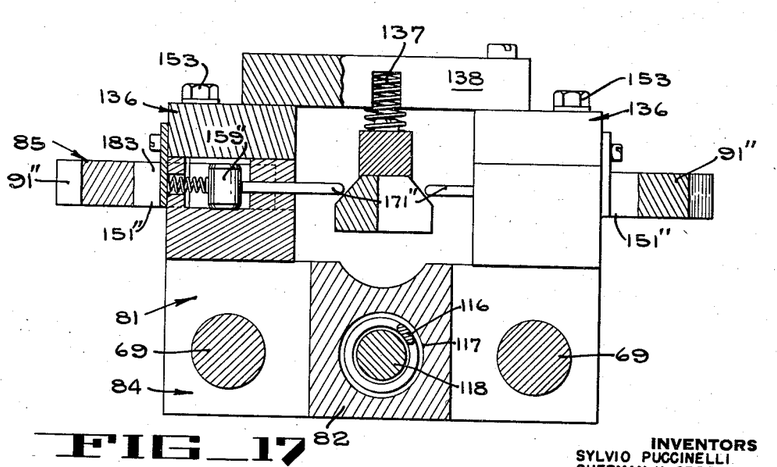
Figure 17 is a sectional view taken on the line 17—17 of Fig. 16.

Figs. 16 and 17 illustrate another modification of locking and releasing mechanism similar in design to that of Figs. 14 and 15 except that it is provided with two opposed chocking rollers 159" engaging respectively the forward and after vertical edges of each finger 151". Accordingly, in this modification both the forward and after edges 182 and 183, respectively, of the finger 151" are of arcuate form centered about the axis of the associated rock shaft (not shown). Each of the edges 182 and 183 of each finger 151" has a vertical backing surface 184, 185, respectively, spaced therefrom to accommodate one of the rollers 159" therebetween, the backing surfaces 184, 185 being disposed in inwardly convergent relation with respect to the surfaces 182 and 183, respectively, of the associated finger 151" so as to develop a wedging or chocking action between the rollers 159" and the fingers 151″ preventing inward motion of the fingers 151″ except when the rollers 159″ are propelled to releasing positions by pins 171″, one of which is associated with each of the rollers 159″. Here again the operation is analogous to that of the form of chocking and releasing mechanisms of Figs. 12 and 13.

The clamp arms 86 support and operate a fruit clamp 190 comprising a clamp plate 191 mounted upon each clamp arm 86, the two clamp plates 191 thus being disposed in opposition to each other. The inner faces of the clamp plates 191 are concave and are provided with pads 192 of suitable cushioning material such as sponge rubber. Each of the clamp plates 191 is mounted upon its associated clamp arm 86 by means of a pivot pin 193, best shown in Fig. 11, extending through and between spaced lugs 194 on the back of the clamp plate 191. The pivot pin 193 also extends through a clearance hole 196 (Fig. 4) in a block 197 which is pivotally mounted by a pin 198 between two plates 199 rigidly secured in spaced parallel relation on the inwardly deflected distal end 201 of the associated clamp arm 86 by bolts 202 provided with lock nuts 203. The pin 198 is of considerably larger diameter than the pin 193 and is provided with a transverse hole 204 (Fig. 4) through which the pivot pin 193 extends so that the pin 193 serves the double function of pivotally mounting the clamp plate 191 upon the block 197 and of locking the pivot pin 198 in position. A cotter pin 206 (Fig. 11) in each end of the pin 193 retains the latter against accidental displacement. Thus it may be seen that each of the clamp arms 86 has a plate 191 mounted thereon for universal movement permitting the clamp plate 191 to adapt itself to the configuration of a pear when moved into clamping engagement therewith. A boss 207 is provided on the back of each clamp plate 191 in position to engage the end 208 of the associated clamp arm 86 to limit pivotal movement of the block 197 in one direction about the axis of the pin 198; and each block is also provided with an adjustable stop pin 209 having a lock nut 211 thereon and engageable with the end 208 of the associated clamp arm 86 to limit pivotal movement of the block 197 in the opposite direction.

The inward deflection of the distal ends 201 of the clamp arms 86 to which the plates 199 are secured so disposes the clamp plates 191 in converging relation with each other, clearly shown in Figs. 3, 4, and 6, that they are in an advantageous position for engagement on a pear.

Figure 9:
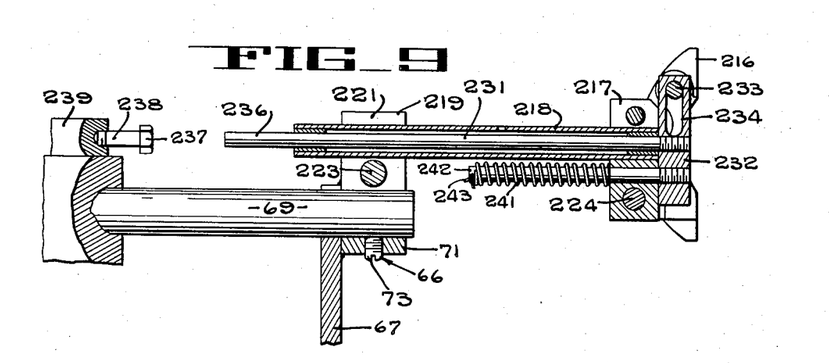
Figure 9 is an enlarged sectional detail view of one of the components of the mechanism, taken along the line 9—9 of Fig. 3.
Figures 10, 11:
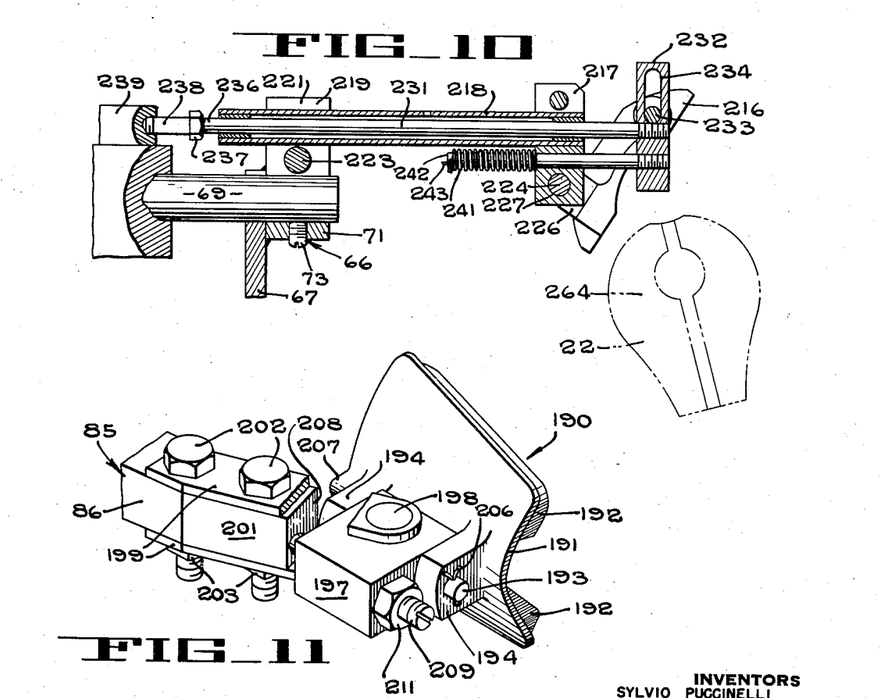
Figure 10 is a view similar to Fig. 9 illustrating a different operational position.
Figure 11 is a perspective of another component of the mechanism of the invention.

In order to prevent the possibility of a pear squeezing rearwardly out from between the clamp plates 191, a pair of concave guard plates 216 are provided. Each of the guard plates 216 is mounted a short distance behind the clamp plates 191 on a bracket 217 rigid with the forward end of a supporting tube 218 adjustably clamped in a bracket 219 provided by an upward extension of the forward frame plate 67 (Figs. 9 and 10). Each of the brackets 219 has a vertical slot 221 intersecting the hole 222 (Figs. 9 and 10) through which the associated supporting tube 218 extends, and a screw 223 extending across the slot 221 may be tightened to grip the support tube 218 tightly in selected position of longitudinal adjustment. Each of the guard plates 216 is pivotally mounted upon its associated bracket 217 by means of a pivot pin 224 rigid with a boss 226 adjacent the lower end of the guard plate and journalled in a hole 227 (Figs. 9 and 10) adjacent the lower end of a bracket 217. A cotter pin 228 (Figs. 2, 3, 4, 5 and 6) extends through the pivot pin 224 at the opposite side of a bracket 217 from the boss 226 of the associated guard plate 216 to secure the pivot pin and guard plate in position with relation to the bracket. A push rod 231 (Figs. 9 and 10) extends slidably through each of the supporting tubes 218 and brackets 217. A cross head 232 is rigidly mounted upon the forward end of each push rod 231 and is operatively connected to the associated guard plate 216 by a pin 233 rigid with the guard plate 216 and slidably seated within a vertical slot 234 in the cross head 232. Each of the push rods 231 is of such length that its after end 236 extends beyond the after end of the support tube 218 in position to engage the head 237 of a bolt 238 threaded through a block 239 rigid with the upper surface of the forward head 83 of the carriage 81. A lock nut 240 (Figs. 3 and 6) is threaded upon the after end of each of the bolts 238 to releasably lock it in adjusted position. The parts are so proportioned that when the carriage 81 approaches its retracted position with respect to the frame 66, the after ends 236 of the push rods 231 engage the heads 237 of the abutment bolts 238 and thus effect forward motion of the push rods 231 within the support tubes 218 and brackets 217, advancing the cross heads 232 from their position illustrated in Fig. 9 to the position shown in Fig. 10 and swinging the guard plates 216 from vertical position to forwardly inclined position for a purpose to be made clear hereinbelow. Upon forward motion of the carriage 81 with respect to the frame 66, the push rods 231 are carried forward from the abutment bolts 238 permitting springs 241 to return the guard plates 216 to their normal upright position, as in Fig. 9. Each of the springs 241 is carried on a pull rod 242, the forward end of which is secured to the associated cross head 232. Each pull rod 242 extends through the associated bracket 217 and the associated spring 241 is under compression between the after face of the bracket 217 and a cotter pin 243 adjacent the after end of the pull rod 242.

The rear plate 68 of the frame 66 is provided with a hole 251 (Figs. 1 and 7) and a channel 252 (Figs. 7 and 8) is provided in the upper surface of the carriage 81 throughout the entire length thereof in alignment with the hole 251 to accommodate the countershaft 46 upon which the calyx trimming knife 29 is mounted (Fig. 1) and to permit freedom of reciprocation of both the frame 66 and the carriage 81 without interfering with operation of the shaft 46. The countershaft 46 carries a pawl 253 extending radially therefrom in position to engage the after end 134 of the latch bar 127 when both the frame 66 and carriage 81 are fully retracted. The bridge 36 is provided with an adjustable stop pin 254 (Fig. 1) disposed in the path of the abutment plate 131 of the carriage 81. The stop pin 254 is adjusted to engage the abutment plate 131 as the carriage 81 is being moved forward by the frame 66 and when the frame has attained a position approximately half-way between its forward and after extremes of movement. A cam plate 256 is rigidly mounted by a bracket 257 (Figs. 1 and 7) on the underside of the carriage 81 and carries wings 258 and 259 which diverge rearwardly from the forward edge 260 of the cam plate presenting sloping edges 261 and 262 respectively (Fig. 4). The edge 260 of the cam plate 256 is substantially in alignment with the after edge of the portion 58 of the cam slot 56 which is perpendicular to the axis of the cam, and the post 53 and roller 54 are long enough to protrude through the cam slot 56 so that portions thereof pass in front of the cam plate 256 as the post 53 is rotated by the sleeve 51.

*Operation*

Figure 7:
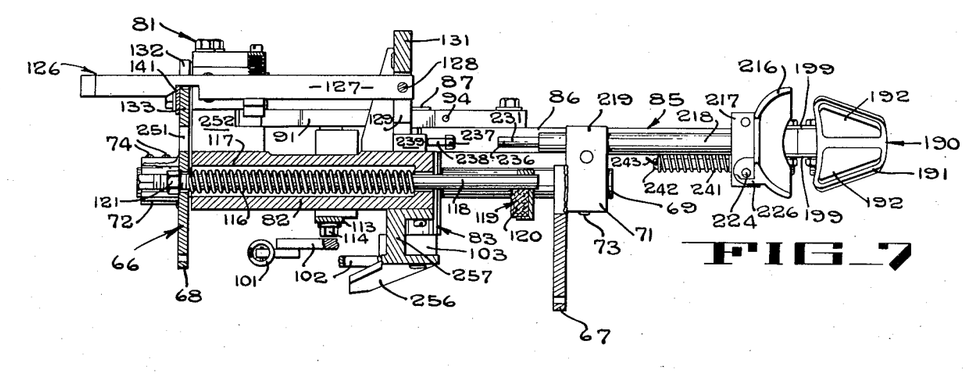
Figure 7 is a vertical section taken along the line 7—7 of Fig. 3.

Let it be assumed that a cycle of operation of the transfer mechanism 21 starts with the parts of the apparatus disposed as illustrated in Fig. 1. The frame 66 of the transfer mechanism 21 is at the forward end of its stroke and the carriage 81 is at its fully retracted position upon the frame 66. Accordingly, the fruit clamp 85 is in its contracted arrangement with a pear 22 on one of the stemming tubes 23 gripped between the two clamp plates 191. The guard plates 216 bear against the butt end of the pear 22 to prevent its slipping out from between the clamp plates 191. Figs. 2, 3 and 7 illustrate the transfer mechanism 21 with its parts arranged in this manner.

The sleeve 51 of the fruit preparation machine is rotating at constant speed carrying with it the post 53 and roller 54 which, as illustrated in Fig. 1, is just entering the sloping portion 60 of the cam cylinder 57. Consequently, the post 53 and the roller 54 move the cam cylinder 57 to the left, as viewed in Fig. 1, carrying with it the entire transfer mechanism 21; and since the pear 22 is gripped securely in the fruit clamps 190, the pear 22 is withdrawn from the stemming tube 23 upon which it has been impaled during the several peeling operations preceding arrival of the pear 22 in alignment with the splitting, trimming, and coring station 26.

As the transfer mechanism 21 is carried to the left by the cam 57 the fruit clamp 85 withdraws the pear from the stemming tube 23 and carries it to the left, as viewed in Fig. 1. The two guard plates 216 and then the two clamp plates 191 pass on opposite sides of the splitting knife 27 thus presenting the pear 22 to the knife 27 and causing the pear 22 to be split in half by the latter. This motion of the transfer mechanism 21 continues until the two halves of the pear thus formed arrive in positions at opposite sides of the stationary coring knife 28 and the calyx portion of the pear is in alignment with the calyx trimming knife 29. Both the knives 28 and 29 are at this time immobilized and the pawl 253, carried by the same countershaft 46 as carries the trimming knife 29, also remains motionless in a position just clear of the latch bar 127 so that as the cam cylinder 57 and transfer mechanism 21 arrive at their fully retracted position, the after end 134 of the latch bar 127 moves into alignment with and immediately behind the pawl 253.

Upon arrival of the cam cylinder 57 at its fully retracted position, the post 53 and roller 54 pass from the sloping portion 60 of the cam cylinder slot 56 into the portion 58 of the slot which extends in a plane perpendicular to the axis of the cam cylinder and which therefore immobilizes the cam cylinder 57 until the post 53 and roller 54 arrive at the entrance end of the sloping portion 59 of the slot 56. During this idle period of the cam cylinder 57, the shaft 49 is rotated by the Geneva drive 48 through an angular distance corresponding to the angular separation of each two adjacent stemming tubes 23, thus rotating the turret 24 far enough to remove the stemming tube 23 from which the transfer mechanism 21 has just withdrawn a pear 22 and bring the next successive stemming tube 23A, with a pear 22A impaled thereon, into alignment with the splitting, coring, and trimming station 26. Simultaneously with this activation of the shaft 29 and turret 24, the two countershafts 42 and 46 are caused to rotate through one full revolution thus activating the coring knife 28 and calyx trimming knife 29 to perform their respective operations upon the flesh of the pear 22 while its halves are still immobilized by the clamp plates 191 and guard plates 216 on opposite sides of the splitting knife 27.

Just before the countershaft 46 completes its full revolution, and consequently just before completion of the respective operations of the coring knife 28 and calyx trimming knife 29, the pawl 253 engages the latch bar 127 lifting it only so high that the shoulder 139 clears the upper edge of the latch plate 141 thus releasing the carriage 81 from the frame 66 as far as the latch mechanism 126 is concerned. However, inasmuch as the post 53 and roller 54 are in or closely adjacent their upright positions, the forward edge of the cam 256 engages the roller 54 which restrains the carriage from being moved forward upon the frame 66 for a short time interval to permit the knives 28 and 29 to complete their respective trimming operations.

It is important to observe that the post 53 and roller 54 prevent the carriage 81 from moving far enough forward on the frame 66 to permit the sloping portion 143 of the shoulder 139 to ride far enough upon the upper edge of the latch plate 141 to lift the latch bar 127 higher than the position to which it has already been lifted by the pawl 253. When the latch bar 127 has thus been only partially lifted, the wedge block 166 is not raised far enough to advance the roller releasing pins 171 far enough to displace the chocking rollers 159. Consequently, the fruit clamp 85 retains the halves of the pear 22 immobilized until the knives 28 and 29 complete their respective trimming operations, even though the latch mechanism 126, holding the carriage 81 in retracted position upon the frame 66, is released prematurely insofar as the operations of the knives 28 and 29 are concerned.

The cam 256 is so proportioned that immediately after completion of a full revolution by the countershaft 46, the roller 54 passes off the forward edge 260 of the cam 256 and proceeds along the sloping edge 262 permitting the carriage 81 to move forward under the influence of the spring 116 but at a speed determined by the pitch of sloping edge 262 of the cam 256. The edge 262 is of sufficient extent to remain in engagement with the roller 54 until the carriage 81 has advanced to its forward extreme of motion on the frame 66 thus permitting the forward head 83 of the carriage 81 to come into engagement with the head 119 on the rod 118 without excessive shock.

Immediately after the roller 54 leaves the forward edge 260 of the cam 256 and starts advancing along the inclined edge 262, the carriage 81 advances far enough for the sloping portion 143 of the shoulder 139 to ride upon the upper edge of the latch plate 141 which forces the latch bar 127 upward, carrying the block 166 upward far enough to wedge the lock releasing pins 171 outward to push the chocking rollers 159 away from their respective locking positions. This releases the clamp arms 86 so that the rollers 109 can spread the arms 86 as the arm extensions 91 advance with respect to the rollers 109, the supporting pins 110 of which remain stationary while the carriage 81 advances with respect to the frame 66. Therefore, the clamp plates 191 are separated causing them to release the pear halves so that they are free to drop from the splitting knife 27 into a trough 263 whereby they are conducted to any suitable point of discharge. In some instances, however, the moist and sticky pear halves may adhere to the sides of the splitting knife 27. The guard plates 216 operate to eject any such adherent pear halves from the blade 27. As the carriage 81 arrives at its forward extreme of motion with respect to the frame 66, the after ends 236 of the push rods 231 are engaged by the heads 237 of the abutment bolts 238 causing the rods 231 and the cross heads 237 thereon to be pushed forward and thus pivoting the guard plates 216 forward and downward as illustrated in Fig. 10. In so doing, the guard plates 216 effectually dislodge any pear halves 264 (Fig. 10) tending otherwise to adhere to the side faces of the splitting knife 27.

Approximately at the time when the carriage 81 arrives at its forward extreme of motion on the frame 66 (Figs. 5 and 6), the post 53 and roller 54 enter the inclined portion 59 of the cam slot 56 and as they progress along this inclined portion, the cam 57 is advanced, carrying the frame 66 with it, forward toward the turret 24. However, the abutment plate 131 on the carriage 81 engages the stop pin 254 just as the carriage 81 arrives at its forward extreme of motion on the frame 66 and as the clamp plates 191 achieve positions of alignment with the pear 22A advanced by the next successive coring tube 23A while the carriage 81 and frame 66 were in their retracted positions, and restrains the carriage 81 against moving forward with the frame which latter therefore advances with respect to the carriage. As the front plate 67 of the frame 66 moves away from the carriage 81, it carries with it the support tubes 218 and brackets 217 permitting the springs 241 to return the cross heads 232 to their positions adjacent the brackets 217 and swing the guard plates 216 to their vertical positions (Fig. 9). Also, as the frame 66 advances with respect to the immobilized carriage 81, the rollers 109 advance along the inclined surfaces 108 in the direction in which they converge thus permitting the spring 101 to spread the extensions 91 apart. This also draws the clamp arms 86 together and causes the clamp plates 191 to engage their next successive pear 22A. As this occurs, the guard plates 216 are advanced with the frame 66 until they assume positions behind the pear 22A and thus complete a cycle of operation of the transfer mechanism 21.

While we have described a particular embodiment of the present invention, it will be understood that various changes and modifications may be made without departing from the spirit of the present invention and the scope of the appended claims.

Having thus described our invention what we claim and desire to protect by Letters Patent is:

1. In fruit handling apparatus, a transfer mechanism comprising a frame mounted for fore and aft movement, reciprocating means therefor, a carriage reciprocably mounted on the frame for fore and aft movement with respect to the frame, a spring engaging said frame and said carriage for urging the carriage forwardly with respect to the frame, opposed arms carried by said carriage, each of said arms being pivotally connected to the carriage for movement about an axis intermediate the ends of the arms, fruit clamping means carried by each of said arms at one end thereof, an outwardly facing camming surface on each of said arms adjacent the other end thereof, said camming surfaces converging toward each other in the direction of the pivotal mounting of the arms, a yoke rigid with said frame, a camming roller engaging each of said camming surfaces and journalled on said yoke, stationary means in the path of movement of said carriage for arresting motion of said carriage as it is moved forward with the frame and before the frame attains its forward extreme of movement, a latch supported by said carriage and having a notch engageable with said frame as the frame approaches its forwardmost position to releasably secure the carriage to the frame, and a trip disposed adjacent the path of rearward movement of said latch and operative while the frame is at the after end of its reciprocatory movement to release the latch and thereby permit said spring to propel the carriage forward on the frame.

2. In fruit handling apparatus, a frame, a carriage reciprocably mounted thereon, a plurality of clamp arms mounted on the carriage for contracting and separating movement, a fruit clamping plate carried by each of said arms, means interconnecting said arms for contracting the arms to dispose said clamping plates in fruit engaging relation, a bracket rigidly mounted on the frame, a guard plate pivotally mounted on said bracket and mounted for movement to and from a position of engagement with fruit engaged by said clamp plates, and means connected to said guard plate and arranged to be contacted by said carriage for moving said guard plate about the axis of its pivotal mounting.

3. In fruit handling apparatus, a frame, a carriage reciprocably mounted thereon, a plurality of clamp arms mounted on the carriage for contracting and separating movement, a fruit clamping plate carried by each of said arms, means interconnecting said arms for contracting the arms to dispose said clamping plates in fruit engaging relation, a tube rigid with said frame, a bracket carried by the tube, a guard plate pivotally mounted on the bracket, a push rod slidable in the tube and connected at one end to said guard plate to turn the guard plate about the axis of its pivotal mounting, an abutment on said carriage engageable with the other end of said rod as the carriage moves on the frame to slide the rod and thereby effect turning of said guard plate in one direction, and a spring operatively associated with said guard plate and said bracket to turn the plate in the opposite direction upon disengagement of said abutment from said rod.

4. A fruit clamp comprising a frame, a carriage mounted on said frame for reciprocatory movement with respect to the frame, a clamp arm mounted on said carriage, means rigid with said arm providing a locking surface, means rigid with said carriage providing a backing surface, said locking and backing surfaces being disposed in converging relation, and a roller interposed between said surfaces for engaging both of said surfaces to lock said arm to said carriage.

5. A fruit clamp comprising a frame, a carriage mounted on said frame for reciprocatory movement with respect to the frame, a clamp arm mounted on said carriage, means rigid with said arm providing a locking surface, means rigid with said carriage providing a backing surface, said locking and backing surfaces being disposed in converging relation, a roller interposed between said surfaces, and yieldable means engaging said roller and said carriage for wedging the roller between said surfaces to lock said arm to said carriage.

6. A fruit clamp comprising a frame, a carriage mounted on said frame for reciprocatory movement with respect to the frame, a clamping arm mounted on said carriage, means rigid with said arm providing a locking surface, means rigid with said carriage providing a backing surface, said locking and backing surfaces being disposed in converging relation, a roller interposed between said surfaces, yieldable means mounted on said carriage in engagement with said roller for wedging the roller between said surfaces, and a release member supported on said carriage and arranged upon being actuated to release the roller from wedging engagement with said surfaces.

7. A fruit clamp comprising a support structure, a pair of opposed clamp arms mounted thereon for pivotal movement toward and away from each other, a finger extending from each of said arms and having a locking surface thereon, means on said support structure presenting a backing surface associated with each of said locking surfaces and disposed in opposed inclined relation therewith, a roller interposed between each locking surface and its associated backing surface, a spring mounted on said structure and arranged for yieldably pressing each of said rollers into chocking engagement with both of its said associated surfaces to lock the associated arm against pivotal movement in one direction, and a release member supported on said structure and arranged upon being actuated to release the rollers from chocking engagement with said surfaces.

8. A fruit clamp comprising a support structure, a pair of opposed clamp arms mounted thereon for pivotal movement toward and away from each other, a finger extending from each of said arms and having a locking surface thereon, means on said structure presenting a backing surface associated with each of said locking surfaces and disposed in opposed inclined relation therewith, a roller interposed between each locking surface and its associated backing surface, a spring mounted on said structure and arranged for yieldably pressing each of said rollers into chocking engagement with both of its said associated surfaces to lock the associated arm against pivotal movement in one direction, and means on said structure and movable into contact with both of said rollers for releasing the rollers from chocking engagement with said surfaces.

9. A fruit clamp comprising a support structure, a pair of opposed clamp arms mounted thereon for pivotal movement toward and away from each other, a finger extending from each of said arms and having a locking surface thereon, means on said structure presenting a backing surface associated with each of said locking surfaces and disposed in opposed inclined relation therewith, a roller interposed between each locking surface and its associated backing surface, a spring mounted on said structure and arranged for yieldably pressing each of said rollers into chocking engagement with both of its said associated surfaces to lock the associated arm against pivotal movement in one direction, a wedge mounted on said structure for movement axially of the wedge and in a direction transverse to the direction of movement of both of said rollers, and reciprocably mounted pins interposed between said rollers and said wedge for displacing both of said rollers from chocking position upon activation of said wedge.

10. A fruit handling apparatus comprising a frame, a plurality of clamp arms individually mounted on said frame for movement independently of each other toward and away from a common center, a concave fruit engaging clamp plate for each of said arms, means mounting each clamp plate for pivoting movement on the associated arm about two axes normal to each other, yieldable means interconnecting said arms and arranged to urge said arms in a direction to move said clamp plates toward said center to engage a piece of fruit, cam members disposed on said frame and on said arms respectively and arranged to be moved into contact for moving said arms to spread said clamp plates against the action of said yieldable means, and means for moving said cam members out of contact to permit the arms to move the clamp plates to fruit engaging position.

11. A fruit transfer mechanism comprising a frame, guiding means mounted thereon, a carriage reciprocably mounted on said guiding means, opposed clamping arms pivotally mounted on said carriage for movement therewith with respect to said frame, each of said arms having a camming surface thereon inclined with respect to the direction of movement of the carriage on said guiding means, a yoke rigid with the frame, camming means on the yoke operatively engaging each of said camming surfaces to spread the arms apart when the frame and carriage move in one direction with respect to each other, spring means interconnecting said arms for pressing said camming surfaces against said camming means to move the arms toward each other when the carriage moves in the opposite direction on said guiding means, means disposed between said carriage and said frame for moving the carriage on said guiding means, locking means operably disposed between said carriage and said arms for restraining the arms from spreading apart, a latch supported on said carriage and arranged for releasably retaining the carriage in position with said arms moved toward each other, and means carried by said latch and engageable with said locking means for releasing said locking means when the latch is released.

12. A fruit transfer mechanism comprising a frame, guiding means mounted thereon, a carriage reciprocably mounted on said guiding means, opposed clamping arms pivotally mounted on said carriage for movement therewith with respect to said frame, each of said arms having a camming surface thereon inclined with respect to the direction of movement of the carriage on said guiding means, a yoke rigid with the frame, camming means on the yoke operatively engaging each of said camming surfaces to spread the arms apart when the frame and carriage move in one direction with respect to each other, spring means interconnecting said arms for pressing said camming surfaces against said camming means to move the arms toward each other when the carriage moves in the opposite direction on said guiding means, means engaging said carriage and said frame for moving the carriage on said guiding means, opposed locking surfaces respectively on one of the arms and on the carriage, a roller interposed between said locking surfaces for engaging said surfaces to restrain the associated arm from spreading movement, an actuating member adjacent said roller and arranged upon being actuated to engage the roller for displacing the roller from restraining engagement with said surfaces, and means carried by said latch for actuating said member when the latch is released.

13. A fruit transfer mechanism comprising a frame, guiding means mounted thereon, a carriage reciprocably mounted on said guiding means, opposed clamping arms pivotally mounted on said carriage for movement therewith with respect to said frame, each of said arms having a camming surface thereon inclined with respect to the direction of movement of the carriage on said guiding means, camming means carried by the frame operatively engaging each of said camming surfaces to spread the arms apart when the frame and carriage move in one direction with respect to each other, spring means interconnecting said arms for pressing said camming surfaces against said camming means to move the arms toward each other when the carriage moves in the opposite direction on said guiding means, means disposed between said carriage and said frame for moving the carriage on said guiding means, locking means operably disposed between said carriage and said arms for restraining the arms from spreading apart, a latch supported on said carriage and arranged for releasably retaining the carriage in position with said arms moved toward each other, and means carried by said latch and engageable with said locking means for releasing said locking means when the latch is released.

References Cited in the file of this patent

UNITED STATES PATENTS

| | | | |
|---|---|---|---|
| 1,392,520 | Paranteau | Oct. 4, | 1921 |
| 1,480,819 | Forrester et al. | Jan. 15, | 1924 |
| 1,775,225 | Jorgensen | Sept. 9, | 1930 |
| 1,785,011 | Felizianetti | Dec. 16, | 1930 |
| 1,839,438 | Prussing | Jan. 5, | 1932 |
| 1,858,642 | Ross | May 17, | 1932 |
| 1,982,779 | Ayars | Dec. 4, | 1934 |
| 2,102,765 | Thompson et al. | Dec. 21, | 1937 |
| 2,261,150 | Ewald | Nov. 4, | 1941 |
| 2,332,058 | Cattonar et al. | Oct. 19, | 1943 |
| 2,414,493 | Urschel et al. | Jan. 21, | 1947 |
| 2,429,346 | Dunn | Oct. 21, | 1947 |
| 2,699,191 | De Back et al. | Jan. 11, | 1955 |
| 2,740,441 | Coons | Apr. 3, | 1956 |
| 2,742,067 | Coons et al. | Apr. 17, | 1956 |
| 2,772,711 | Carroll | Dec. 4, | 1956 |
| 2,775,279 | Perelli | Dec. 25, | 1956 |

UNITED STATES PATENT OFFICE

CERTIFICATE OF CORRECTION

Patent No. 2,883,070                 April 21, 1959

Sylvio Puccinelli et al.

It is hereby certified that error appears in the printed specification of the above numbered patent requiring correction and that the said Letters Patent should read as corrected below.

Column 1, line 23, for "assume" read -- assure --; column 8, line 26, after "extends" insert -- slidably --.

Signed and sealed this 26th day of July 1960.

(SEAL)
Attest:
KARL H. AXLINE
Attesting Officer

ROBERT C. WATSON
Commissioner of Patents